US008844340B2

(12) United States Patent
Agache

(10) Patent No.: US 8,844,340 B2
(45) Date of Patent: Sep. 30, 2014

(54) DEVICE FOR THE GRAVIMETRIC DETECTION OF PARTICLES IN A FLUID MEDIUM, COMPRISING AN OSCILLATOR OVER WHICH A FLUID STREAM FLOWS, PRODUCTION PROCESS AND METHOD OF EMPLOYING THE DEVICE

(75) Inventor: Vincent Agache, St Martin le Vinoux (FR)

(73) Assignee: Commissariat a l'Energie et aux Energies Alternatives, Paris (FR)

( * ) Notice: Subject to any disclaimer, the term of this patent is extended or adjusted under 35 U.S.C. 154(b) by 630 days.

(21) Appl. No.: 12/993,492

(22) PCT Filed: Apr. 24, 2009

(86) PCT No.: PCT/FR2009/000487
§ 371 (c)(1),
(2), (4) Date: Feb. 2, 2011

(87) PCT Pub. No.: WO2009/141516
PCT Pub. Date: Nov. 26, 2009

(65) Prior Publication Data
US 2011/0167908 A1 Jul. 14, 2011

(30) Foreign Application Priority Data

May 20, 2008 (FR) ...................... 08 02743

(51) Int. Cl.
*G01N 15/06* (2006.01)
*G01N 29/00* (2006.01)
*G01N 5/00* (2006.01)
*G01G 3/13* (2006.01)
*G01G 3/16* (2006.01)

(52) U.S. Cl.
CPC ... *G01G 3/13* (2013.01); *G01G 3/16* (2013.01)
USPC ....................................... 73/61.75

(58) Field of Classification Search
CPC ........... B23P 11/00; G01N 9/10; H01L 41/08; H03B 5/30
USPC .............. 73/24.01, 24.06, 32 A, 54.24, 61.75
See application file for complete search history.

(56) References Cited

U.S. PATENT DOCUMENTS

| 2,303,375 | A | * | 12/1942 | Mason | 310/362 |
|---|---|---|---|---|---|
| 5,235,233 | A | * | 8/1993 | Yamamoto | 310/313 A |
| 5,306,644 | A |  | 4/1994 | Myerholtz et al. |  |
| 5,744,902 | A | * | 4/1998 | Vig | 310/360 |
| 6,119,518 | A | * | 9/2000 | Itou et al. | 73/504.16 |
| 6,845,666 | B2 | * | 1/2005 | Mochida | 73/504.12 |
| 7,119,636 | B2 | * | 10/2006 | Nguyen et al. | 333/186 |
| 7,178,378 | B2 | * | 2/2007 | Crawley et al. | 73/24.06 |

FOREIGN PATENT DOCUMENTS

| EP | 1 059 521 | A2 |  | 12/2000 |  |
|---|---|---|---|---|---|
| EP | 1729123 | A2 | * | 12/2006 | G01N 27/00 |
| WO | WO 00/20850 |  |  | 4/2000 |  |

OTHER PUBLICATIONS

International Search Report and Written Opinion for International Application No. PCT/FR2009/000487.

* cited by examiner

*Primary Examiner* — Daniel S Larkin
*Assistant Examiner* — Irving A Campbell
(74) *Attorney, Agent, or Firm* — Alston & Bird LLP

(57) ABSTRACT

The invention provides a device for the gravimetric detection of particles in a fluid medium, simultaneously providing a high quality factor, easier operating conditions, small size and low production costs. For this purpose, the subject of the invention is a device for the gravimetric detection of particles in a fluid medium, comprising a flat electromechanical oscillator (1), means for supporting the oscillator and means for actuating said oscillator, said means being designed to ensure that the oscillator (1) vibrates in its plane, said device further including a channel (4) for passage of the fluid, said channel being in fluid communication with a through-cavity (1b) made in said oscillator.

28 Claims, 5 Drawing Sheets

DEVICE FOR THE GRAVIMETRIC DETECTION OF PARTICLES IN A FLUID MEDIUM, COMPRISING AN OSCILLATOR OVER WHICH A FLUID STREAM FLOWS, PRODUCTION PROCESS AND METHOD OF EMPLOYING THE DEVICE

FIELD OF THE INVENTION

The present invention relates to the technical field of the gravimetric detection in a fluid medium (liquid, gaseous) from resonant structures of NEMS/MEMS (Nano-Electro-Mechanical System/Micro-Electro-Mechanical System) types.

BACKGROUND OF THE INVENTION

This gravimetric detection generally relies on the detection of variations in the vibration frequency of an electromechanical oscillator when a molecule is deposited on its surface.

Any oscillator subject to a vibration force in turn enters into vibration. At certain frequencies, specific to each oscillator, the vibration amplitude is maximal. These frequencies are called "resonance frequencies". Thus, subjecting an oscillator to a vibration of a frequency equal to one of its resonance frequencies makes it possible to detect the deposition of a particle on the oscillator. In practice, this deposition modifies the vibration frequency of the oscillator which therefore no longer vibrates at a resonance frequency. The vibration amplitude is then reduced and can easily be detected. The minimum amplitude difference that can be detected determines the resolution of the detection device, in other words, the minimum detectable weight of a particle being deposited on the oscillator.

This method can be used to:
  detect the presence of a molecule,
  detect the mass of the molecule,
  characterize the kinetics of association/dissociation of a molecule with a complementary molecule recognition element (antibodies, nucleic acid probes or even printed polymer) previously grafted by design on the surface of said oscillator.

This invention therefore relates to the field of methods for the direct detection, without marking, of biological or chemical events.

Many documents describe gravimetric detection sensors based on NEMS/MEMS oscillators.

Thus, it is possible to cite works in which the use is made of a mass sensor in the form of a fixed-fixed beam made of silicon carbide, made to vibrate by magnetostatic transduction.

Throughout the description, the term "beam" will be understood to mean an elongate part, substantially horizontal, the thickness and the width of which are of the same order of magnitude (ratio between approximately 0.8 and 1.2), which are relatively low relative to the length of the beam.

This sensor has made it possible to detect and weigh xenon atoms, deposited in a high vacuum ($10^{-10}$ Torr) and at very low temperature (4.2° K), on the surface of the sensor. Such a sensor exhibits a resolution of the order of seven zeptograms (zg) and a mass sensitivity of the order of 0.96 Hz/zg.

The highly restrictive conditions of operation of this sensor make it difficult, or even impossible, to use for biological purposes because the magnetostatic transduction is low in an aqueous medium and the powerful vacuum is incompatible with in vivo measurements.

Also known are a number of works regarding gravimetric detection with electromechanical oscillators working in an aqueous medium. Thus, it is possible to cite the article by T. Adrega et al., "Resonance of electrostatically actuated thin-film amorphous silicon microelectromechanical systems microresonators in aqueous solutions: Effect of solution conductivity and viscosity", *J. Appl. Phys.* 2007, 101, 094308. This article describes a fixed-fixed beam set to vibrate off-plane, and the resonance frequency of which is measured through an optical detection. The quality factor of such a structure is relatively low since it is of the order of 3, given the volume of liquid that is displaced by the structure set in motion and the significant mechanical stressing of the anchor points. Moreover, this structure is bulky because the fixed-fixed beam is in the form of a bridge under which is arranged an actuation electrode. This bulk is further increased by the presence of the detection means, in this case, a laser source and a photodiode.

Also worth citing are the works regarding the use of a cantilevered beam-type electromechanical oscillator. The results of these works are explained in detail in the article by J. Teva et al., "A femtogram resolution mass sensor platform based on SOI electrostatically driven resonant cantilever. Part II: Sensor calibration and glycerin evaporation rate measurement", *Ultramicroscopy* 2006, 106, 808-814. A microdroplet of glycerin is deposited accurately on this oscillator, then resonance frequency measurements are performed to follow the speed of evaporation of the droplet. This method, which consists in extracting a mass variation from a frequency measurement, entails a preliminary step for calibration of the mass sensitivity based on latex balls.

It is not possible to consider that the oscillator is placed in a liquid medium during the measurement, since only a droplet is deposited at the end of the oscillator, the rest of the detector being kept in a dry medium. The use of the device described in this article by Teva has therefore never been validated in an aqueous medium. The use of such an oscillator for biological purposes cannot therefore be envisaged because it is necessary, in this case, to extract a reaction kinetic in real time and therefore, generally, in an aqueous medium.

Finally, other works can be cited which have consisted in incorporating a biological solution to be analyzed within the oscillator itself. These works are explained in detail in the article by S. Manalis et al., "Weighing of biomolecules, single cells and single nanoparticles in fluid", *Nature* 446, Apr. 26, 2007, (7139): 1066-1069.

The oscillator is in the form of a cantilevered beam in which there is provided a fluid stream tightly isolated from the medium in which the oscillator, of which it forms part, is actuated. This oscillator is set to vibrate by electrostatic coupling at 220 kHz and in a powerful vacuum, whereas the biological solution to be analyzed flows within the integrated fluid stream. In this configuration, a quality factor of 15000 is obtained, and remains unchanging whether the channels are filled with air or with liquid. These works have made it possible to follow the reaction kinetics of an antibody-antigen recognition, for an antigen concentration of 100 ng·ml$^{-1}$, which places this type of device at the same rank as the best quartz balances in terms of resolution.

These works do, however, have limitations, lying notably in the detection method employed. In practice, it implements an optical detection using a laser and an external photodiode, which contribute to the overall bulk of the system.

It emerges from this presentation that there is currently no device for gravimetric detection that implements a cost-effective NEMS/MEMS oscillator, allowing for a detection of particles in a liquid medium, in conditions that are compatible with biological analyses, offering a high quality factor and a reduced bulk.

SUMMARY OF THE INVENTION

The object of the invention is to overcome these drawbacks by proposing a device for the gravimetric detection of particles in a fluid medium that simultaneously provides a high quality factor, easy conditions of use, a reduced bulk and a low production cost.

This device can, notably, be used to form a diagnostic at the very bedside of the patient, the real-time monitoring of physiological parameters in the case of an in-vivo implantation (for example: dosing of HbA1c glycosylated hemoglobin for the treatment of diabetes and preventing or stopping the development of ocular, renal and neurological complications), or for the detection of toxic and pathogenic species in air or in water.

To this end, the subject of the invention is a device for the gravimetric detection of particles in a fluid medium, comprising a flat electromechanical oscillator, support means for the oscillator and means of actuating said oscillator, said means being arranged to ensure that the oscillator vibrates in its plane, said device also including a channel for passage of the fluid, said channel being in fluid communication with a through-cavity formed in said oscillator.

Throughout the description, the expression "flat oscillator" will be understood to mean a wafer having a length and a width that are large relative to its thickness (ratio greater than 2), the length and the width preferably being of the same order of magnitude.

According to other features of the invention:
  the electromechanical oscillator may have a shape taken from a disc, a ring and a polygon, preferably a square;
  said actuation means may be in the form of at least one electrode arranged in the same plane as that of the oscillator, and at a determined distance from the oscillator;
  the oscillator may be square and have a width and a thickness such that the ratio of the width to the thickness is between 10 and 30, preferably 10;
  the oscillator may be a polygon and the support means may be distributed over at least one vertex of the oscillator;
  in the case of a square electromechanical oscillator, the support means may be arranged on the four vertices of said oscillator;
  the support means may be in the form of solid pieces, such as blocks;
  on each vertex of the oscillator, the support means may include a fork comprising a handle and two teeth oriented in the extension of a diagonal of the oscillator passing through said vertex, the teeth being linked to a solid part;
  on each vertex of the oscillator, the support means may include a beam oriented in the extension of a diagonal of the oscillator passing through said vertex, the beam being linked to a solid part;
  said electromechanical oscillator may be obtained from a metallic substrate;
  said electromechanical oscillator may be obtained from a polycrystalline substrate;
  said electromechanical oscillator may be obtained from a monocrystalline substrate;
  the substrate may be silicon-based;
  said monocrystalline substrate may be oriented in the crystallographic plane (100) or, alternatively, in the crystallographic plane (110);
  said through-cavity of the oscillator may be at least partially covered by molecule recognition elements; and/or
  said through-cavity of the oscillator and/or the channel may contain pillars with a transverse cross-sectional shape selected from a circle, an ellipse and a polygon.

This device may, notably, be used for the formation of a diagnostic at the very bedside of the patient, the real time monitoring of physiological parameters in the case of an in-vivo implantation (for example: dosing of HbA1c glycosylated hemoglobin for the treatment of diabetes and preventing or stopping the development of ocular, renal and neurological complications), or for the detection of toxic and pathogenic species in air or in water.

The invention also relates to a process for producing an above device, comprising the following steps:
  the selection of a substrate that is appropriate to the planned gravimetric detection,
  the production, from said substrate, of a flat electromechanical oscillator, suspended between two openings,
  the production of a through-cavity in said oscillator,
  the production of a channel for passage of the fluid, said channel being in fluid communication with said through-cavity formed in the oscillator.

The invention also relates to a method for the gravimetric detection of particles in a fluid medium, implemented with a flat electromechanical oscillator, comprising the following steps:
a) generating a fluid flow to bring the fluid in contact with the oscillator; in the through-cavity;
b) setting the oscillator to vibrate at an initial frequency and according to a determined vibration mode;
c) detecting the vibration frequency of the oscillator;
d) detecting a modification of the frequency relative to the initial vibration frequency of the oscillator.

By convention, the steps of this process are carried out in alphabetical order.

According to other features of the invention:
  the gravimetric detection method may comprise a step e) for the recovery and processing of detection data generated in the steps c) and d);
  the initial vibration frequency may be a resonance frequency of the oscillator;
  the vibration mode may be taken from the group formed by the Lamé vibration mode, the volume extension vibration mode, the so-called "wine glass" vibration mode, an off-plane vibration mode and a bending mode;
  the steps b) to d) may be implemented by electrodes arranged in the same plane as the oscillator and at a determined distance from the oscillator;
  the gravimetric detection method may implement a square oscillator and four electrodes each arranged facing one of the sides of the oscillator, the vibrating of the oscillator provided in the step b) being preceded by a step b1) in which at least two consecutive electrodes are supplied with sinusoidal fields in phase opposition and at a determined frequency characteristic of the particles to be detected;
  the step b1) may be preceded by a step b0) in which the fluid flow is stopped;
  the gravimetric detection method may comprise a step a0) prior to the step a), in which the surface of the cavity formed in the oscillator is at least partially covered by molecule recognition elements; and/or
  the steps b) to d) may be implemented by means incorporated in the oscillator.

The invention also relates to a method of determining interaction kinetics between a molecule and a complementary molecule recognition element, using the above gravimetric detection method, and comprising a step d') for detection of a new modification of the frequency corresponding to a return to the value of the resonance frequency of the oscillator, this step d') being carried out after the step d).

According to another feature, the steps b), c), d) and d') may be implemented by electrodes arranged in the same plane as the oscillator.

Finally, the invention relates to an electromechanical oscillator for a gravimetric detection device according to the invention, said oscillator being flat, a through-cavity being formed in said oscillator.

BRIEF DESCRIPTION OF THE DRAWINGS

Other features of the invention will emerge from the following detailed description, given with reference to the figures which represent, respectively.

DETAILED DESCRIPTION OF THE INVENTION

Figure 1:
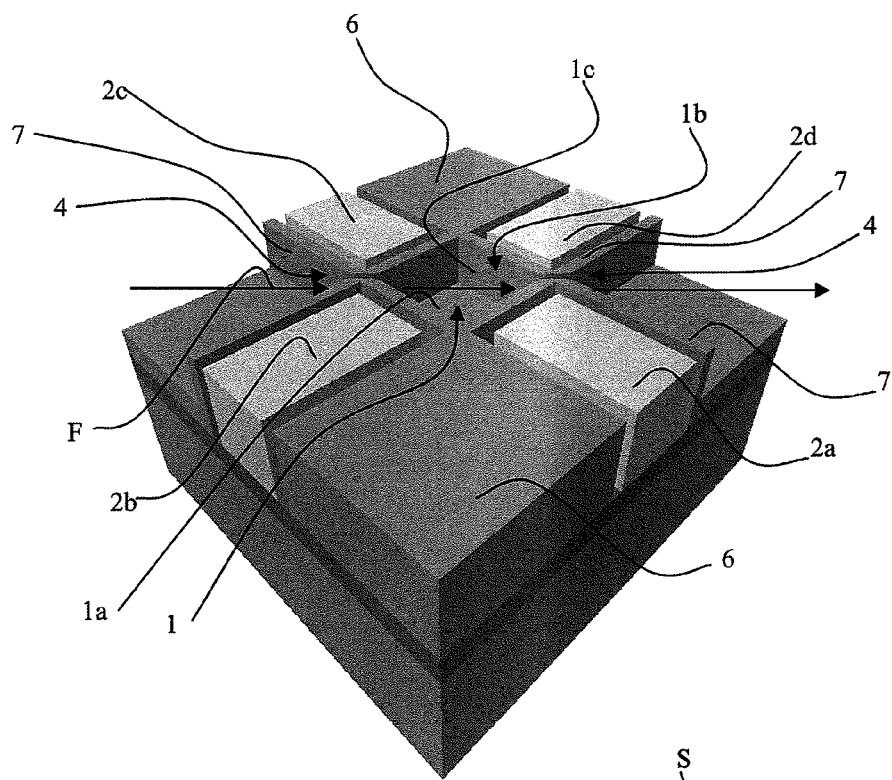
FIG. 1, a perspective schematic view of a bottom portion of a fraction of a gravimetric detector according to the invention.
Figure 3:
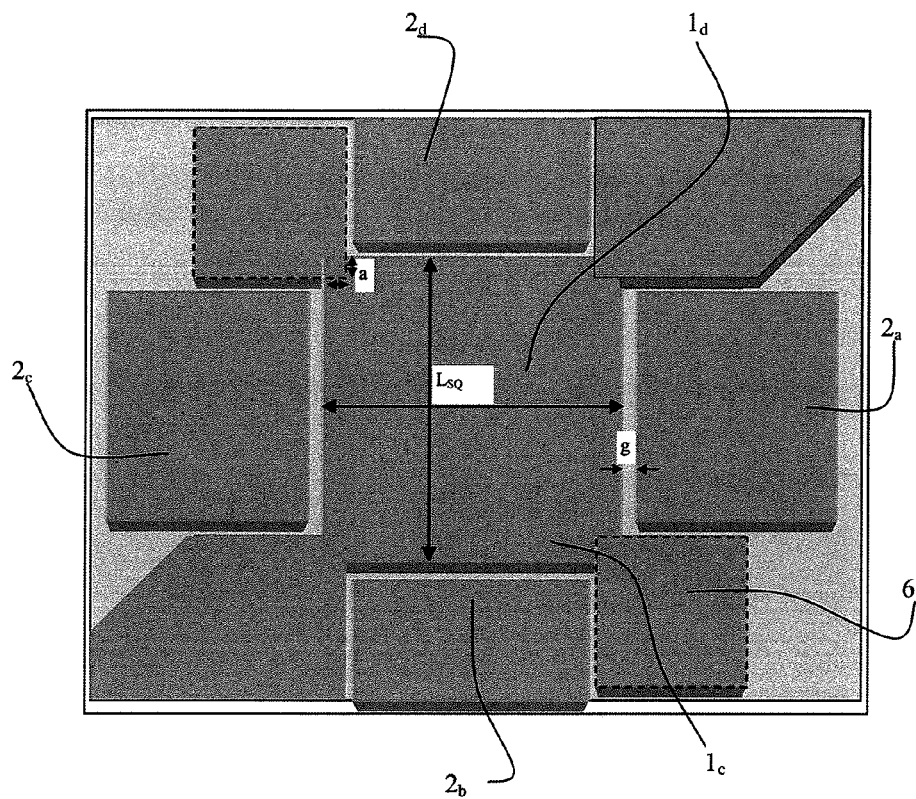
FIG. 3, a plan schematic view of a detector according to the invention provided with suspension means for the oscillator according to a first embodiment.

A gravimetric detection device according to the invention, represented in FIG. 1, comprises a flat electromechanical oscillator 1 comprising a square bottom 1a and sides 1c, defining a through-cavity 1b. Facing each of the sides, at a determined distance g (see FIG. 3), an electrode 2a, 2b, 2c and 2d is arranged in the same plane as the oscillator. Throughout the application the expression "an arrangement in the same plane" will be understood to mean the fact that the electrodes are facing the sides of the oscillator, parallel to its bottom and substantially of the same thickness. Also, the distance g must be as small as possible, its value being limited mainly by the resolution of the lithography tools and by the thickness $T_{SQ}$ of the wafer 1 (typically g is of the order of $T_{SQ}/10$ and greater than 100 nm).

Figure 2:
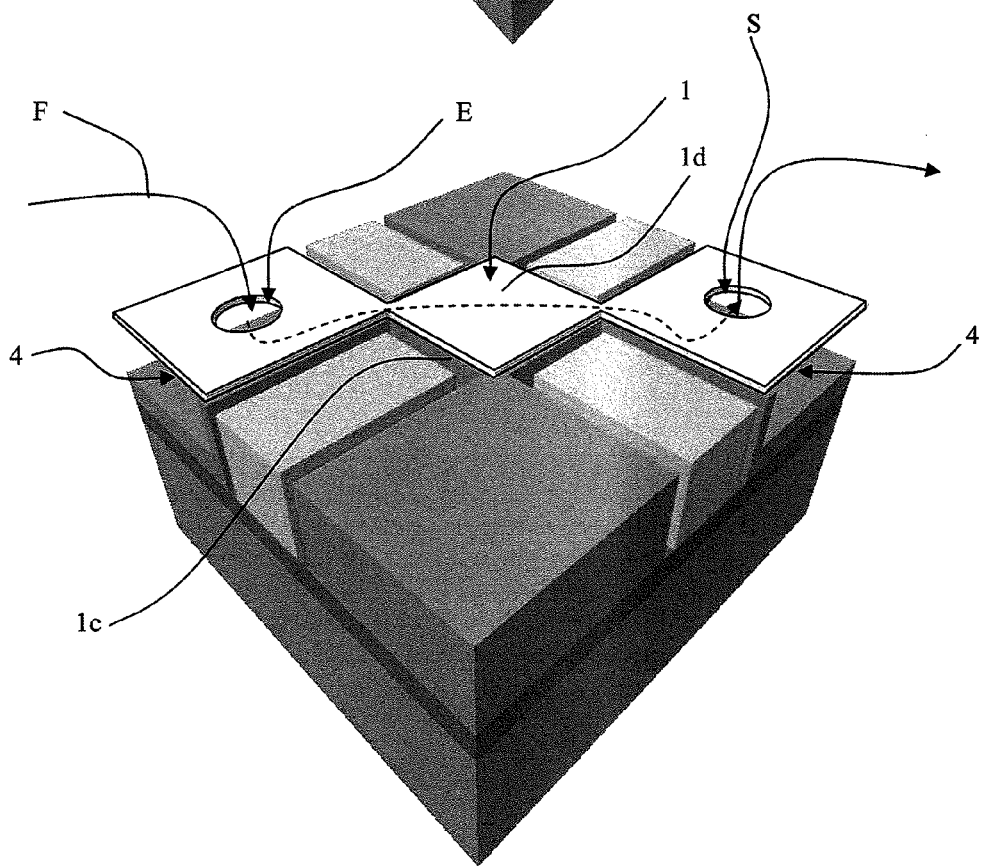
FIG. 2, a perspective schematic view of the detector of FIG. 1, and partly completed.

Referring to FIG. 2, this illustrates the wall 1d, opposite the bottom 1a.

Also, the oscillator 1 is supported by support means above an opening 3 (see FIG. 11) so that it can enter into vibration, preferably at its resonance frequency (according to a Lamé mode, or a volume extension mode, for example), substantially in its plane, by electrostatic coupling via the electrodes. That said, the gravimetric detector according to the invention has a high quality factor since the volume of fluid displaced is located inside the through-cavity of the oscillator.

This vibration is made possible not only by the opening 3 but also by an opening 61 (FIG. 10) formed above the oscillator and by the distances g separating the oscillator from the electrodes.

The device also comprises a channel 4 for passage of a fluid, arranged to be in fluid communication with the through-cavity 1b of the oscillator 1. Thus, as illustrated by the arrow F in FIG. 2, the fluid enters into the device through a fluid inlet E, crosses the cavity of the oscillator and then leaves the device through the fluid outlet S.

Thus, the fluid analyzed by the device is tightly isolated from the environment in which the oscillator is actuated and which is, preferably, a dry medium.

According to a preferred embodiment, the flat electromechanical oscillator is in the form of a wafer with a width $L_{sq}$ and a thickness $T_{sq}$ such that the ratio $L_{sq}/T_{sq}$ of the width to the thickness is between 10 and 30, preferably 10. In this way, the wafer exhibits a vibrational behavior different from a membrane.

In a preferred embodiment, the support means are distributed on the four vertices of the oscillator. They may be in the form of solid parts, such as blocks 6 and pairs of arms 7, as illustrated in FIG. 1. In this figure, it can be seen that the two parts 6 and respectively the two pairs of arms 7 are in the extension of the diagonals of the oscillator 1. Said pairs of arms are machined so as to allow the circulation of fluid within the cavity 1b passing through the oscillator 1. Alternatively, the support means may be limited to two pairs of arms 7 which may be arranged diametrically opposite in the extension of the diagonals of the oscillator 1, or arranged at two adjacent vertices of the latter. Finally, a last configuration consists in using only a single block 6 and two pairs of arms 7 as support means.

Figure 4:
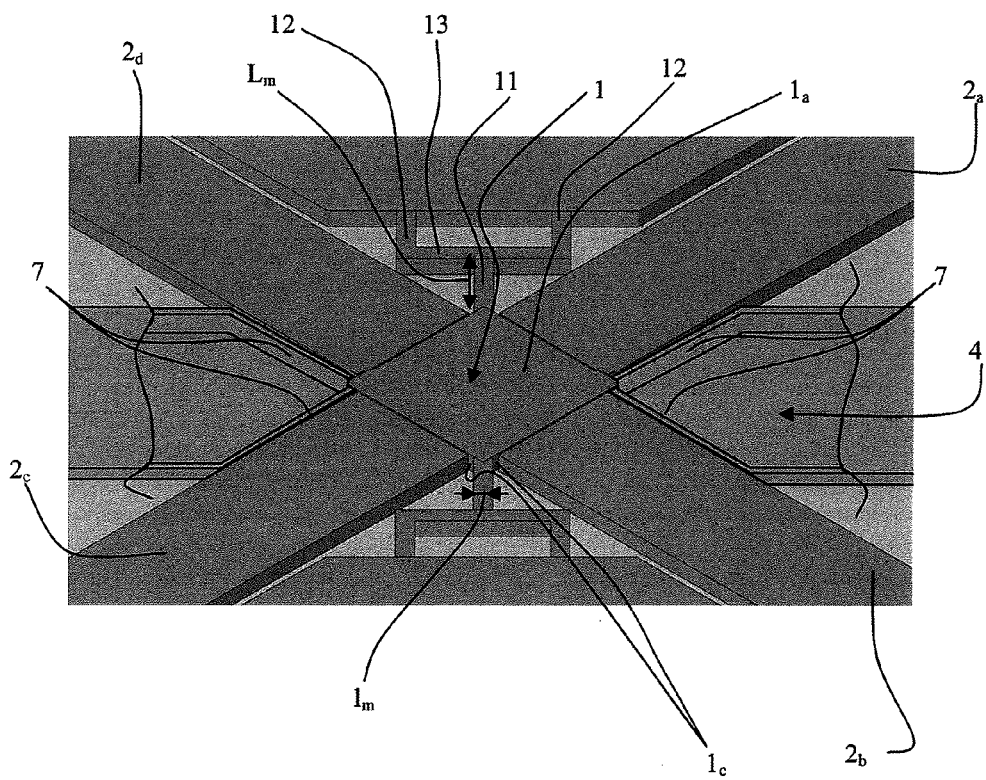
FIG. 4, a perspective schematic view of a detector according to the invention provided with suspension means for the oscillator according to a second embodiment.

As illustrated in FIG. 4, the support means may also be in the form of pairs of arms 7 and forks 10 comprising a handle 11 and two teeth 12, the arms and the forks being in the extension of the diagonals of the oscillator and the teeth of the fork being linked to a solid part 13.

The length $L_m$ of the handle 11 of the fork is chosen so that the handle can preferably vibrate in longitudinal extension, alternatively by lateral flexing, when the oscillator vibrates, preferably at a resonance frequency of the oscillator (Lamé mode, volume extension mode, or "wine glass" mode if it is a ring or a disc for example).

Moreover, the width $l_m$ of the handle is equivalent to $L_{sq}/10$, in which $L_{sq}$ designates the width of the oscillator 1. The width "a" of contact between the blocks 6 or the arms 7 and the oscillator 1 is chosen so that these support means solidly support the oscillator, while altering as little as possible the vibration of the oscillator according to the desired vibration modes. For this, the dimensioning rules observe the following condition: $a \leq L_{sq}/10$.

The actuation means are implemented and arranged relative to the oscillator so that said oscillator can enter into vibration, in its plane, according to a determined vibration mode. Depending on the manner in which the actuation means are activated, the oscillator may vibrate according to different modes, such as the Lamé mode, the volume extension mode or, according to the so-called "wine glass" mode (in particular for a circular or annular oscillator).

The oscillator 1 may be set to vibrate, in its plane, by electrostatic coupling, via at least one of the four electrodes 2a to 2d, or, in a preferred embodiment, two adjacent electrodes.

The oscillator 1 may also be set to vibrate outside of its plane and according to a bending mode. However, such an implementation will reduce the quality factor of the oscillator.

In order to miniaturize the various elements of the gravimetric detection device, it is desirable to produce them using micro- or nano-structuring techniques on a substrate that may consist either of a polysilicon layer deposited on a thermal oxide, or an SOI (Silicon On Isolator) substrate. The latter substrate consists of two monocrystalline silicon layers between which is arranged a layer of silicon dioxide ($SiO_2$).

Hereinafter in this description, the exemplary embodiments are described for a gravimetric detection device machined on SOI substrates of crystallographic orientation (100). Alternatively, the SOI substrates used may be oriented in the crystallographic plane (110). One of the advantages of this technology relies on the lesser subjection to the mechanical dissipation mechanisms than that of polycrystalline materials (for example polysilicon) in which grain joint relaxation phenomena are often observed.

Thus, when an SOI substrate is used, the oscillator illustrated in FIG. 4 is fabricated so that the sides $1c$ of the wafer and the electrodes $2a$ to $2d$ have a crystallographic orientation in the direction <110>. The sides of a handle and of the two teeth of each fork of the suspension means then have a crystallographic orientation in the direction <100>.

The production of a gravimetric detection device according to the invention comprises, generally, the following steps:
  selection of a substrate that is appropriate to the gravimetric detection envisaged,
  production, from said substrate, of a flat electromechanical oscillator suspended between two openings,
  production of a through-cavity in the oscillator, and
  production of a channel for the passage of the fluid, the channel being in fluid communication with the through-cavity formed in the oscillator.

One embodiment of a device according to the invention is illustrated in FIGS. 5 to 12.

For a mass gravimetric detection on the kilodalton (kDa) scale, or even below this scale, an appropriate substrate may be an SOI silicon substrate. According to the embodiment described, the fabrication method consists in producing the oscillator in two parts, namely a first part produced on a first SOI substrate 20 and a second part produced on a second SOI substrate 30 sealed onto the first substrate. Moreover, the other components (support means, opening, electrodes, channel) of the gravimetric detection device are also structured on these SOI substrates 20-30.

Figure 5:
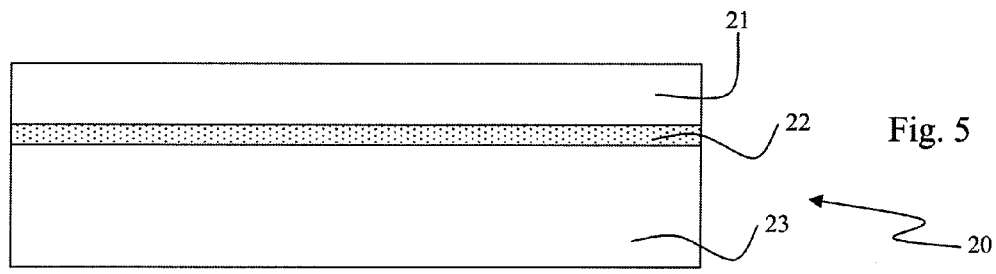
FIGS. 5 to 11, schematic views of substrates for a preferred method of fabricating a detector according to the invention at different steps in production.

More specifically, the first SOI substrate 20, illustrated in FIG. 5, comprises a layer 21 of monocrystalline silicon, which may be strongly doped (the concentration of the charge carriers possibly being greater than $5.10^{18}$ atoms per $cm^3$), of P or N type, of a thickness of between 1 and 5 µm, and more particularly 3 µm in a preferred embodiment. Under this layer 21 is arranged a layer 22 of buried insulating silicon dioxide ($SiO_2$), with a thickness of approximately 1 to 3 µm. Under this layer 22 is arranged a layer 23 of monocrystalline silicon, with high resistivity ($\rho$>1000 ohm·cm), in a preferred embodiment, and oriented in the crystallographic plane (100). This layer 23 has a thickness of approximately 725 µm.

Figure 6:
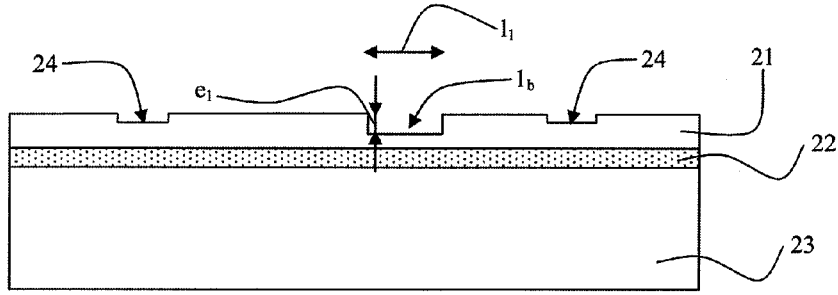

In an optional first step, illustrated in FIG. 6, alignment marks 24 may be produced on the external surface of the layer 21. These marks allow for a more accurate alignment of the two substrates 20 and 30 during the second step.

Figure 7:
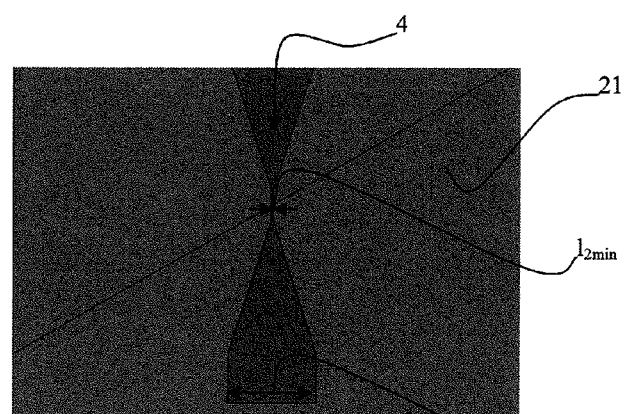
Figure 13:
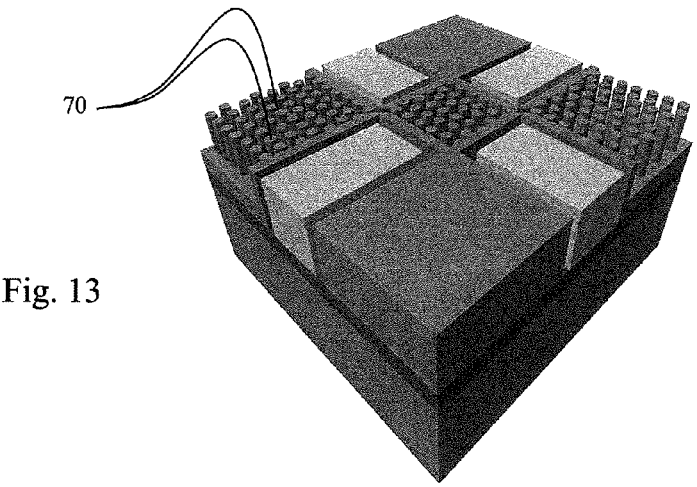
FIG. 13, a perspective schematic view of a detector according to the invention provided with pillars.

In a second step, the through-cavity $1b$ of the oscillator 1 is etched into the top layer 21 of doped silicon of the SOI substrate 20. This cavity $1b$ preferably has a depth $e_1$ of 1.5 µm and a width $l_1$ of 3 µm. In a particular embodiment, said cavity may include pillars 70 (see FIG. 13), spaced apart at intervals that may or may not be regular, depending on their position in the through-cavity. The fluid circulation channel 4 is also structured in the top layer 21 of doped silicon, in fluid communication with the cavity $1b$ of the future oscillator. Preferably, as illustrated in FIG. 7, the channel has a maximum width $l_{2max}$ of approximately 110 µm, this width reducing progressively until it reaches a minimum width $l_{2min}$ equal to the width $l_1$ of the cavity, that is to say, in the embodiment illustrated, 3 µm. This channel 4 may also contain pillars.

Said pillars may be arranged upstream and/or downstream of the cavity $1b$ machined in the oscillator (that is to say, before and/or after the passage for the arms 7 indicated in FIG. 1). Upstream of the oscillator, they may be used to capture the molecules that are not of interest and that are brought via the fluid inlet E. For this, the spacing between these pillars is adjusted so as to allow the molecules of interest to circulate from the inlet E to the outlet S, but not the other molecules. Arranging pillars downstream of the oscillator makes it possible to reverse the direction of circulation of the fluid and thus facilitate the use of the detection device according to the invention which does not depend on the direction of flow of the fluid.

When the pillars are incorporated in the oscillator, they are used to support and reinforce the wall $1d$ covering the cavity $1b$ formed within the oscillator. They are also used to increase the capture area available for the grafting of the biological objects of interest, in order to increase the probability of capture and the sensitivity of the sensor.

The pillars have a transverse cross section of circular, elliptical or polygonal shape.

Figure 8:
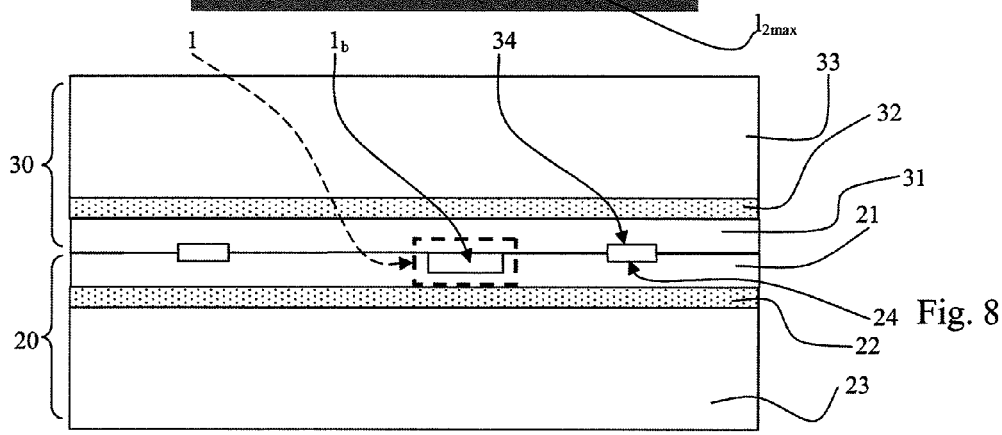

The second SOI substrate 30, illustrated in FIG. 8, comprises a layer 31 of monocrystalline silicon which may be strongly doped (the concentration of the charge carriers possibly being greater than $5.10^{18}$ atoms per $cm^3$), of P or N type, of a thickness between 100 and 340 nm, and more particularly 160 nm in a preferred embodiment. On this layer 31 is arranged a layer 32 of buried insulating silicon dioxide ($SiO_2$), of a thickness of approximately 1 to 3 µm. On this layer 32 is arranged a layer 33 of monocrystalline silicon, with high resistivity ($\rho$>1000 ohm·cm) in a preferred embodiment, and oriented in the crystallographic plane (100). This layer 33 has a thickness of approximately 725 µm.

The SOI substrate 30 may also be structured in order to define therein alignment marks 34 on the external surface of its layer 31, as well as the openings E and S (see FIG. 2), to allow access to the fluid circulation channel 4 machined in the top layer 21 of the substrate 20, once the two substrates are joined together. The second substrate 30 has also been structured with a view to the subsequent lithography steps necessary for the production in the final device of the electrodes, of the support means and of the oscillator and, more particularly, their alignment relative to the fluid circulation channel 4 machined in the top layer 21 of the substrate 20.

In a third step, illustrated in FIG. 8, the second SOI substrate 30 is aligned, deposited and sealed onto the first substrate 20, so that the layer 31 of strongly doped monocrystalline silicon, identical to that 21 of the first substrate 20, covers the cavity $1b$ that was structured during the first step.

Figure 9:
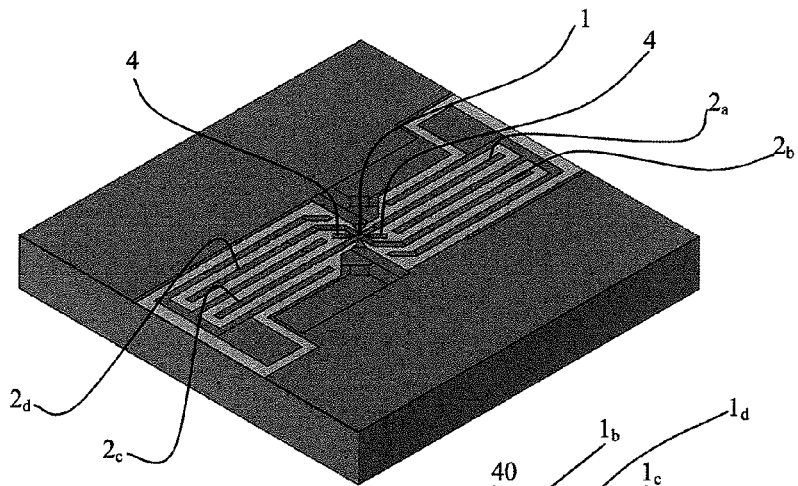

In a fourth step, illustrated in FIG. 9, the layer 33 of silicon of the second SOI substrate 30 is thinned, for example by a chemical etch with TMAH (tetramethylammonium hydroxide). Then, the buried silicon dioxide layer 32 is removed by chemical etch so that only the layer 31 of strongly doped silicon remains.

Figure 10:
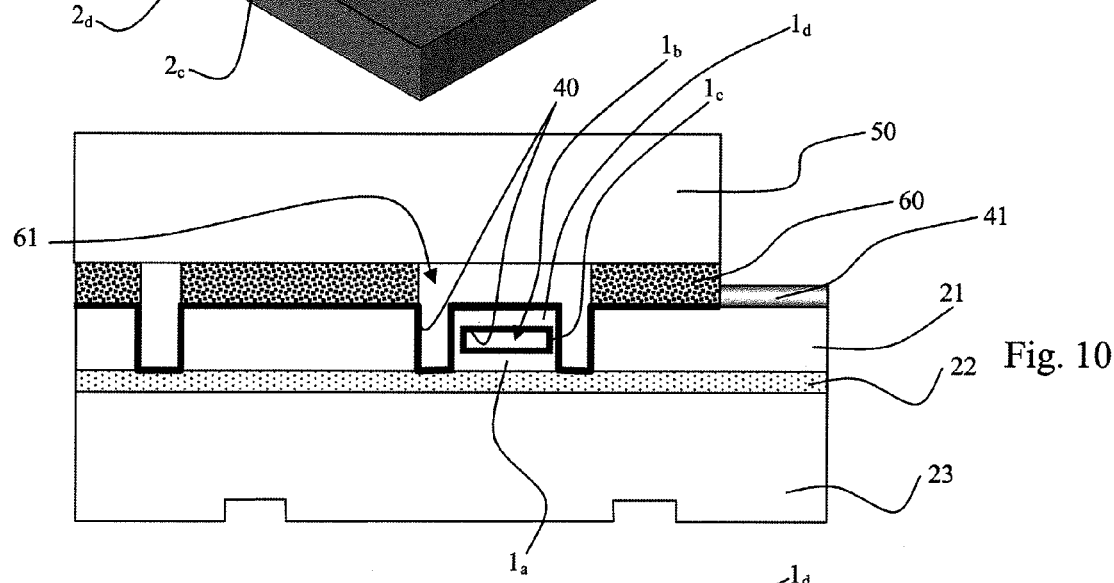

Moreover, the assembly 20-30 is subjected to a lithography and a dry etch so as to delimit the sides $1c$ of the oscillator 1 (see FIG. 10). Also, a layer of electrical insulating material is formed by thermal oxidation or ALD (Atomic Layer Deposition) conformal deposition of a "high-k" (high permittivity) oxide of $Al_2O_2$ or $HFO_2$ type on the areas intended to come into contact with the fluid, to avoid the appearance of leakage currents in the aqueous medium.

A resin is then spread over the side and then exposed through a mask to locally etch, by photolithography, this deposit of insulating material, in order to release the latter from the future electrical contact bumps.

After the resin has been removed, a metal layer 41 is deposited on the front face of the assembly 20-30. A resin is then spread over this face and then exposed through a mask to define thereon a mold which will be used to define the electrodes by electrolysis. This electrolytic growth (preferably based on gold) is followed by the chemical removal of the resin, and of the previously deposited layer of metal.

Finally, a cap 50, under which is deposited a structured layer 60 of a biocompatible material, is deposited on the assembly 20-30 so as to form an opening 61 above the oscillator 1. The cap 50 is transparent, preferably, made of glass or of Pyrex®. It may be machined so as to be able to carry out probe tests and replace the contacts on biasing bump contacts of the oscillator located at the periphery of the assembly 20-30 and electrically linked to the oscillator via the support means. The layer 60 is, preferably, made of a biocompatible polymer or of a layer of highly resistive silicon.

Figure 11:
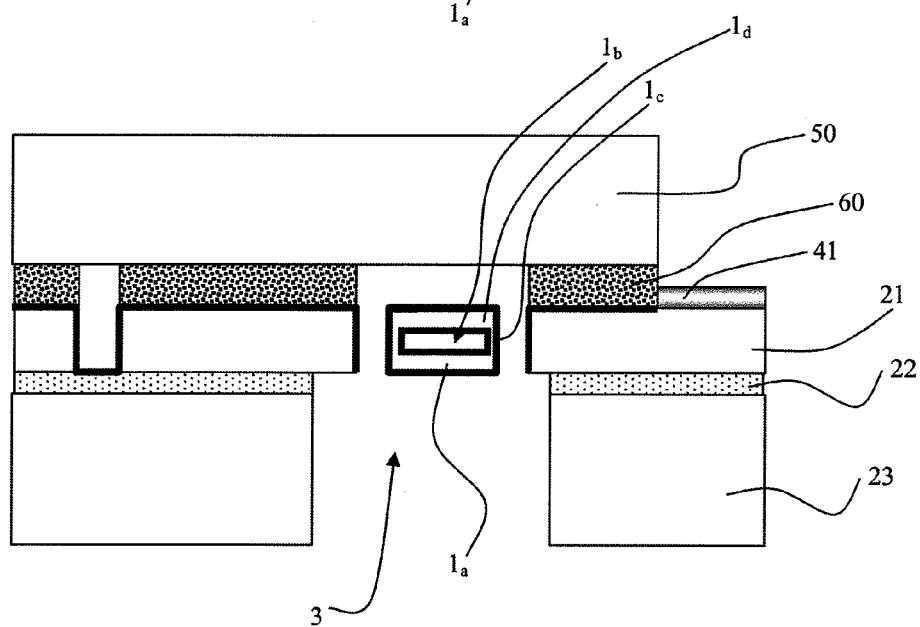

Finally, an opening 3 is etched under the oscillator 1, in the layers 22 and 23, to enable it to enter into vibration according to a determined vibration mode (FIG. 11).

One method of gravimetric detection of particles in a fluid medium according to the invention consists in implementing the electromechanical oscillator described previously. This implementation comprises the following steps:
a) generating a fluid flow to bring fluid in contact with the oscillator in the through-cavity 1b;
b) setting the oscillator 1 to vibrate at an initial frequency and according to a determined vibration mode;
c) detecting the vibration frequency of the oscillator 1;
d) detecting a modification of the frequency relative to the initial vibration frequency of the oscillator 1.

The vibrating of the oscillator at its initial frequency may be done according to a number of vibration modes. In a preferred embodiment of the invention, for which the oscillator would consist of a square wafer, by virtue of the arrangement of the electrodes facing each edge of the oscillator and in the same plane as the wafer, the vibration modes which can be used, with good results, are the Lamé vibration mode, the volume extension vibration mode (or so-called breathing mode), and the so-called "wine glass" mode when the oscillator is a disc or a circular ring.

Preferably, the initial vibration frequency is a resonance frequency of the oscillator.

According to the Lamé vibration mode, the four corners of the oscillator and its center form vibration nodes (zero displacement and minimal energy loss). The shear wave which is associated with this vibration mode is propagated along the diagonals of the square, so that, in the fundamental mode, the deformations of two consecutive sides of the square are phase-shifted by $\pi$ relative to one another. The result of this is an isochore mode, which allows for a significant reduction in the thermoelastic losses through the structure set to vibrate, unlike the fixed beams (fixed-fixed or cantilevered) which are stressed by bending. In other words, the Lamé mode allows for a significant improvement in the quality factor because the corners of the square wafer constitute the vibration nodes. They are thus subjected to almost no mechanical stress during the vibration, so that this vibration is not dissipated to the rest of the device. All the vibration is concentrated on the oscillator so that the least deposition of a molecule on its surface or removal of a molecule from its surface can be detected.

To obtain a vibration of the oscillator in the Lamé mode, at least one electrode arranged facing an edge of the oscillator is powered using an AC signal $v_{in}$ of resonance frequency $f_{in}$ corresponding to the expected Lamé mode. The oscillator is biased via one of its support means which is powered by a DC voltage signal $V_{DC}$, the role of which is to act on the amplitude of the vibration-initiating electrostatic force, and on the value of the resonance frequency of the oscillator. In a preferred embodiment, to make the oscillator vibrate in the Lamé mode, two electrodes (2a and 2b for example), situated facing two consecutive edges of the water, are biased with the same signal $v_{in}$, but phase-shifted by $\pi$ relative to one another, while the oscillator remains biased using the DC voltage signal $V_{DC}$.

Figure 12:
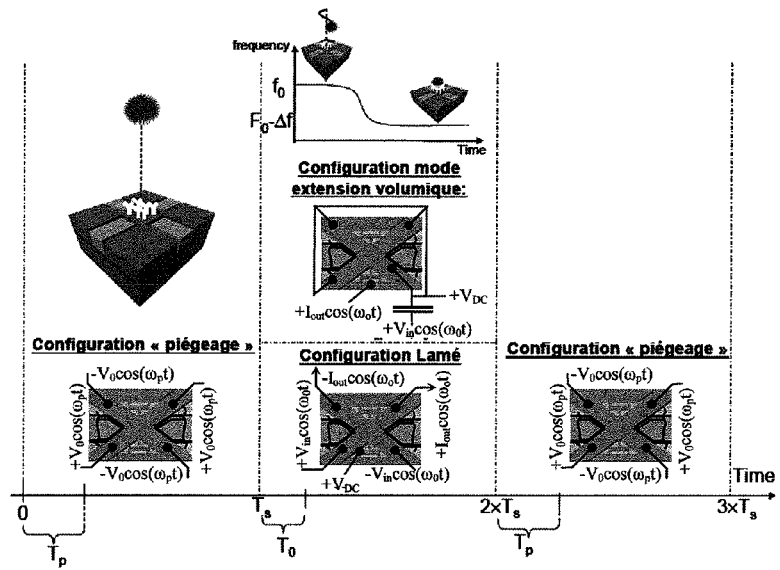
FIG. 12, a schematic representation of the control of the electrodes for the implementation of a gravimetric detection method according to the invention.

The vibration frequency is preferably detected by capacitive coupling via a current $I_{out}$ generated by modulating the transduction capacitance between the oscillator set to vibrate and at least one of the electrodes which would not be powered by the AC signal $v_{in}$ (see FIG. 12). Thus, the output capacitive current $I_{out}$ is measured at least on one of the electrodes 2c or 2d which is not controlled by the excitation signal $v_{in}$. In a preferred embodiment of the invention, this current $I_{out}$ results from the sum of two currents $I_{out1}$ and $I_{out2}$, deriving from the capacitive coupling between the wafer in motion and two adjacent electrodes 2c or 2d which are not powered by the AC signal $v_{in}$. The current $I_{out1}$ is reversed before addition with this current $I_{out2}$.

To obtain a vibration in the volume extension mode, at least one electrode arranged facing an edge of the oscillator is powered by an AC signal $v_{in}$ of resonance frequency $f_{in}$ corresponding to the expected volume extension mode, overlaid on a DC voltage signal $V_{DC}$, the role of which is to act on the amplitude of the vibration-initiating electrostatic force, and on the value of the resonance frequency of the oscillator. In a preferred embodiment, to excite the volume extension mode, the four electrodes facing edges of the wafer will be biased with the same signal $v_{in}$, overlaid on a DC voltage signal $V_{DC}$. The vibration frequency is detected via a current $I_{out}$ detected on one of the support means 6 (see FIG. 12).

In the volume extension vibration mode, the shape of the wafer is retained (square) and its sides vibrate in phase (expansion and contraction) unlike in the Lamé mode for which two adjacent sides vibrate with a phase-shift of $\pi$ relative to one another.

Thus, when the fluid circulates inside the channel 4 and in the cavity 1b, and the oscillator vibrates at its resonance frequency, it is possible to observe a variation of the resonance frequency when particles are deposited on the walls of the cavity 1b of the oscillator 1, or, on the other hand, when particles become detached from these walls and are once again in solution.

The gravimetric detection method according to the invention comprises a step e) for recovery and processing of detection data generated in the steps c) and d), these data being used to deduce, for example, the mass of the particles that are deposited on the oscillator, or that are detached from the latter and are once again in the fluid.

Two methods can be used to improve the particle detection using the detection device according to the invention. These methods can be combined together.

A first method consists in at least partially covering the surface of the cavity 1b within the oscillator with molecule recognition elements. If there are pillars within the through-cavity 1b, said elements may also cover said pillars. The elements are linked specifically with the molecules that are to be detected and allow for a targeted detection of these molecules in a fluid including molecules of different types.

A second method, illustrated in FIG. 12, is based on the dielectrophoretic effect. It is allowed by the four-pole configuration of the electrodes of the device.

Thus, when the vibrating of the oscillator provided for in the step b) is preceded by a step b1) in which at least two consecutive electrodes are powered by sinusoidal fields in phase opposition and at a determined frequency f characteristic of the particles to be detected, and this during the time interval [0; $T_s$], an entrapment phenomenon is obtained by keeping the particles that are to be detected in "levitation" above the bottom 1a of the cavity 1b of the oscillator.

Preferably, two facing electrodes are powered with sinusoidal fields at a determined frequency (f) characteristic of the particles to be detected, at the same potential +$V_0$, the other two electrodes being in phase opposition, at the potential −$V_0$ (so-called "alternating field" configuration). In so doing, the entrapment phenomenon is obtained above the center of the bottom 1a of the cavity 1b of the oscillator.

The step b1) is preferably preceded by a step b0) in which the fluid flow in the channel is stopped. This step b0) thus improves the entrapment.

Then, the electrodes are powered during the time interval [$T_s$; $2T_s$], so as to make the oscillator vibrate in a determined vibration mode (Lamé mode, volume extension mode, wine glass mode if it is a disc or ring, for example, or similar). During this interval, the molecules are deposited on the bottom 1a of the cavity 1b of the oscillator, since they are now neither driven by the fluid nor maintained in levitation by the dielectrophoretic effect.

The gravimetric detection method according to the invention can be used to determine an interaction kinetic between a molecule and a complementary molecule recognition element arranged on any wall of the cavity. In this case, the method consists, in a step d), in detecting a first modification of the vibration frequency of the oscillator when the molecule is fixed to the molecule recognition element arranged on the surface of the cavity of the oscillator, then, in a step d'), in detecting a new modification of the frequency, corresponding to a return to the resonance frequency value of the oscillator, when the molecule is detached from the molecule recognition element. This step d') is performed after the step d) of the gravimetric detection method.

This interaction kinetics determination method can be exploited in the context of the molecular dynamic to assess, for example, the association/dissociation constants between widely varying biomolecules (proteins, DNA, RNA, polysaccharides, lipids, even viruses and cells). Interactions worth mentioning include antigen-antibody, antibody-antibody, hormone-receptor, drug-receptor, enzyme-cofactor/inhibitor, protein-DNA, protein-RNA, DNA-DNA, lipoprotein-enzyme, protein-peptide, phages-antibodies, etc.

The gravimetric detection device according to the invention also makes it possible to monitor the trajectory of particles circulating within the through-cavity through the intermediary of the continuous measurement of the vibration frequency of the oscillator. In practice, in addition to the mass of the particles of interest, their position within the cavity formed in the oscillator will have an influence on the offset of the vibration frequency of said oscillator (as explained in detail for a cantilever beam in the article by S. Manalis et al., "Weighing of biomolecules, single cells and single nanoparticles in fluid", *Nature* 446, Apr. 26, 2007 (7139): 1066-1069). This operating mode means that there is no capturing of objects of interest on the walls of the oscillator and therefore it is best not to graft molecule recognition elements into the cavity of the oscillator.

The gravimetric detection device according to the invention offers numerous advantages compared to the devices of the prior art consisting of fixed beams (fixed-fixed beams or cantilever beams).

The gravimetric detection device according to the invention is more sensitive and more effective than an equivalent beam provided with a fluid stream. It also allows for the use of larger and therefore less expensive structuring techniques.

Moreover, its bulk is reduced because the actuation and detection means are incorporated in the oscillator, in that they are produced in the same substrate and the same plane as the latter. Also, the fabrication techniques used are compatible with an integration of the signal conditioning and shaping electronics (transimpedance amplifier, phase-shifter, etc.) in the vicinity of the oscillator.

The structure of the oscillator according to the invention allows for a gravimetric detection of particles whose minimum detectable mass is approximately thirty-two times smaller than that detected using the devices of the prior art in the form of beams provided with a fluid stream.

Furthermore, the device according to the invention can be employed in vivo and does not require an accurate deposition of the particles on the oscillator. In this case, the device can be implanted in the human or animal and the data are emitted by radio waves to an external server.

Also, by making the fluid circulate within the oscillator, it becomes possible to do away with the hydrodynamic forces and the sensitivity of the sensor can be optimized. Its quality factor is also improved compared to an oscillator in the form of a wafer vibrating between two fluid channels, because the latter displaces a quantity of liquid greater than that displaced by a device according to the invention.

Finally, the oscillator according to the invention requires no calibration step, unlike the TEVA device.

According to other embodiments, the oscillator may be a polygon and the support means may be arranged on at least one peak of the oscillator.

The invention claimed is:

1. A device for the gravimetric detection of particles in a fluid medium, comprising a flat electromechanical oscillator, a support for the oscillator and at least one electrode configured and arranged in the same plane as that of the oscillator, and at a determined distance (g) from the oscillator so that the oscillator vibrates in its plane, said device also including a channel for passage of the fluid, said channel being in fluid communication with a through-chamber formed in said oscillator.

2. The device as claimed in claim 1, in which the electromechanical oscillator has a shape taken from a disc, a ring, a square, and a polygon.

3. The device as claimed in claim 1, in which the oscillator is square and has a width (Lsq) and a thickness (Tsq) such that the ratio of the width to the thickness (Lsq/Tsq) is between 10 and 30.

4. The device as claimed in claim 1, in which the oscillator is a polygon and the support is distributed over at least one vertex of the oscillator.

5. The device as claimed in claim 4, in which, in the case of a square electromechanical oscillator, the support is arranged on the four vertices of said oscillator.

6. The device as claimed in claim 4, in which, on each vertex of the oscillator, the support includes a fork comprising a handle and two teeth oriented in the extension of a diagonal of the oscillator passing through said vertex, the teeth being linked to a solid part.

7. The device as claimed in claim 4, in which, on each vertex of the oscillator, the support includes a beam oriented in the extension of a diagonal of the oscillator passing through said vertex, the beam being linked to a solid part.

8. The device as claimed in claim 1, in which the support is in the form of solid pieces.

9. The device as claimed in claim 1, in which said electromechanical oscillator is obtained from a metallic substrate.

10. The device as claimed in claim 1, in which said electromechanical oscillator is obtained from a polycrystalline substrate.

11. The device as claimed in claim 10, in which the substrate is silicon-based.

12. The device as claimed in claim 1, in which said electromechanical oscillator is obtained from a monocrystalline substrate.

13. The device as claimed in claim 12, in which said monocrystalline substrate is oriented in the crystallographic plane (100) or, alternatively, in the crystallographic plane (110).

14. The device as claimed in claim 1, in which said through-chamber of the oscillator is at least partially covered by molecule recognition elements.

15. The device as claimed in claim 1, in which said through-chamber of the oscillator and/or the channel contains pillars with a transverse cross-sectional shape selected from a circle, an ellipse and a polygon.

16. A method of producing a device as claimed in claim 1, comprising the following steps:
    selecting a substrate that is appropriate to the planned gravimetric detection,
    producing from said substrate, a flat electromechanical oscillator, suspended between two openings,
    producing a through-chamber in said oscillator
    producing a channel for passage of the fluid, said channel being in fluid communication with said through-chamber formed in the oscillator.

17. An electromechanical oscillator for a device for the gravimetric detection of particles in a fluid medium, as claimed in claim 1, said oscillator being in the form of a flat wafer, a through-chamber being formed in said oscillator.

18. A method for the gravimetric detection of particles in a fluid medium, implemented with a flat electromechanical oscillator including a through-chamber, and comprising the following steps:
    a) generating a fluid flow to bring the fluid in contact with the oscillator in the through-chamber,
    b) setting the oscillator to vibrate at an initial frequency and according to a determined vibration mode;
    c) detecting the vibration frequency of the oscillator;
    d) detecting a modification of the frequency relative to the initial vibration frequency of the oscillator.

19. The gravimetric detection method as claimed in claim 18, comprising a step e) for the recovery and processing of detection data generated in the steps c) and d).

20. The gravimetric detection method as claimed in claim 18, in which the initial vibration frequency is a resonance frequency of the oscillator.

21. The gravimetric detection method as claimed in claim 18, in which the vibration mode is taken from the group formed by the Lamé vibration mode, the volume extension vibration mode, the so-called "wine glass" vibration mode, an off-plane vibration mode and a bending mode.

22. The gravimetric detection method as claimed in claim 18, in which the steps b) to d) are implemented by electrodes arranged in the same plane as the oscillator and at a determined distance (g) from the oscillator.

23. The gravimetric detection method as claimed in claim 22, implementing a square oscillator and four electrodes each arranged facing one of the sides of the oscillator, in which the vibrating of the oscillator provided in the step b) is preceded by a step b1) in which at least two consecutive electrodes are supplied with a sinusoidal field in phase opposition and at a determined frequency (f) characteristic of the particles to be detected.

24. The gravimetric detection method as claimed in claim 23, in which the step b1) is preceded by a step b0) in which the fluid flow is stopped.

25. The gravimetric detection method as claimed in claim 18, comprising a step a0) prior to the step a), in which the surface of the through-chamber of said oscillator is covered at least partially by molecule recognition elements.

26. The gravimetric detection method as claimed in claim 18, in which the steps b) to d) are implemented by electrodes incorporated in the oscillator.

27. A method of determining interaction kinetics between a molecule and a complementary molecule recognition element, using the gravimetric detection method as claimed in claim 18, and comprising a step d') for detection of the frequency corresponding to a return to the value of the resonance frequency of the oscillator, this step d') being carried out after the step d).

28. The method of determining interaction kinetics between a molecule and a complementary molecule recognition element as claimed in claim 27, in which the steps b), c), d) and d') are implemented by electrodes arranged in the same plane as the oscillator.

* * * * *

UNITED STATES PATENT AND TRADEMARK OFFICE
CERTIFICATE OF CORRECTION

PATENT NO.         : 8,844,340 B2                                      Page 1 of 1
APPLICATION NO.    : 12/993492
DATED              : September 30, 2014
INVENTOR(S)        : Agache It is certified that error appears in the above-identified patent and that said Letters Patent is hereby corrected as shown below:

In the claims:

Column 14, Claim 27,
Line 39, "detection of the" should read --detection of a new modification of the--.

Signed and Sealed this
Twenty-first Day of April, 2015

Michelle K. Lee
*Director of the United States Patent and Trademark Office*